(12) United States Patent
Crisp

(10) Patent No.: US 9,032,231 B1
(45) Date of Patent: May 12, 2015

(54) POWER SAVING FOR BROADBAND COMMUNICATIONS DEVICES

(75) Inventor: Russell L. Crisp, Atlanta, GA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 541 days.

(21) Appl. No.: 13/187,564

(22) Filed: Jul. 21, 2011

Related U.S. Application Data

(60) Provisional application No. 61/366,195, filed on Jul. 21, 2010.

(51) Int. Cl.
*G06F 1/00* (2006.01)
*H04M 7/00* (2006.01)
*H04L 12/28* (2006.01)

(52) U.S. Cl.
CPC ..... *H04M 7/006* (2013.01); *H04Q 2213/13199* (2013.01); *H04Q 2213/13334* (2013.01); *H04L 2012/2845* (2013.01); *H04Q 2213/1308* (2013.01)

(58) Field of Classification Search
CPC .......... H04Q 2213/13199; H04Q 2213/13334; H04Q 2213/1308; H04M 7/0009; H04M 1/72536; H04M 7/006; H04L 12/10; H04L 2012/2845; H04L 12/66; G06F 1/30; G06F 1/3287; H04W 88/16; H04W 52/028

USPC .......................................................... 713/323
See application file for complete search history.

(56) References Cited

U.S. PATENT DOCUMENTS

| | | | | |
|---|---|---|---|---|
| 2006/0274764 | A1* | 12/2006 | Mah et al. | 370/401 |
| 2008/0018427 | A1* | 1/2008 | Ezra et al. | 340/7.32 |
| 2008/0159744 | A1* | 7/2008 | Soto et al. | 398/115 |
| 2008/0181393 | A1* | 7/2008 | Brost et al. | 379/413 |

* cited by examiner

*Primary Examiner* — Jaweed A Abbaszadeh
*Assistant Examiner* — Xuxing Chen
(74) *Attorney, Agent, or Firm* — Troy A. Van Aacken

(57) ABSTRACT

Systems and methods can provide for power saving in broadband communications devices. In some implementations, such systems and methods can generate and/or receive interrupts to ascertain external power unavailability, operate on battery power, instruct functional modules to enter power saving mode, await restoration of external power, and instruct modules to resume normal operations. In other implementations, such systems and methods can detect external power unavailability via polling, operate on battery power, instruct any or all of primary and auxiliary processor(s) to enter power saving mode, monitor when external power has been restored, and instruct functional modules to resume normal operation. Power saving mode can reduce the rate of modem battery drain and thus reduce the likelihood of a service outage and extend service duration.

17 Claims, 6 Drawing Sheets

POWER SAVING FOR BROADBAND COMMUNICATIONS DEVICES

RELATED APPLICATION

This application claims priority as a non-provisional utility of U.S. Provisional Patent Application Ser. No. 61/366,195, entitled "Power Saving for Broadband Communication Devices," filed Jul. 21, 2010, which is incorporated herein by reference in its entirety.

TECHNICAL FIELD

This disclosure relates to power saving for broadband communications devices.

BACKGROUND

Broadband based services can be delivered via existing cable infrastructure from MSOs, digital subscriber lines (xDSL), integrated service digital network (ISDN), public switched telephone networks, or T1 connections from telecommunications operators or internet service providers, satellite from satellite operators, or wireless services (such as, e.g., cellular, 802.11 or Wi-MAX standards) from wireless service providers, among many others. Broadband services can be categorized into high and low priority services. High priority services can include telephony, medical monitoring and alarm systems while low priority services can include internet access and video delivery. Subscribers typically access broadband services with customer premise equipment device(s) (CPE) at their location.

One such CPE device can receive information from and transmit information to termination systems (e.g., edge devices). The device can modulate and demodulate signals (modems) from termination systems and provide end users with the ability to access various broadband services. Examples of such modem devices include cable modems (CM), enhanced multimedia terminal adapters (eMTA), digital subscriber line (DSL) modems, wireless modems, set-top boxes (STB), among others.

After devices are deployed into service, they typically have a relatively long operating life. Such devices are typically powered by an external alternating current (AC) power source and/or one or more battery. Moreover, occasionally devices that have been deployed experience an external power failure. Typically when such failures occur, a modem device switches to backup battery operation. However, normal operation using backup battery can be short lived, thus leading to an outage in broadband services.

SUMMARY

Systems and methods can operate to provide power savings during power outages. Methods can include generating a power failure signal upon detecting loss of a first power source; providing power with an auxiliary power source upon detecting loss of the first power source; instructing a primary processor and logic associated with a first group of communication services to enter a first power savings mode powered by the auxiliary power source; instructing one or more auxiliary processors and logic associated with a group of second communication services to enter a second power savings mode powered by the auxiliary power source; identifying that the first power source is restored; and, instructing the primary processor and logic to exit the first power savings mode, and one or more auxiliary processors and logic to exit the second power savings mode.

BRIEF DESCRIPTION OF THE DRAWINGS

Many details of the disclosure can be better understood with reference to the following drawings. The elements in the drawings are not necessarily to scale, emphasis instead being place upon clearly illustrating the principles of the preset disclosure.

DETAILED DESCRIPTION

Figure 1:
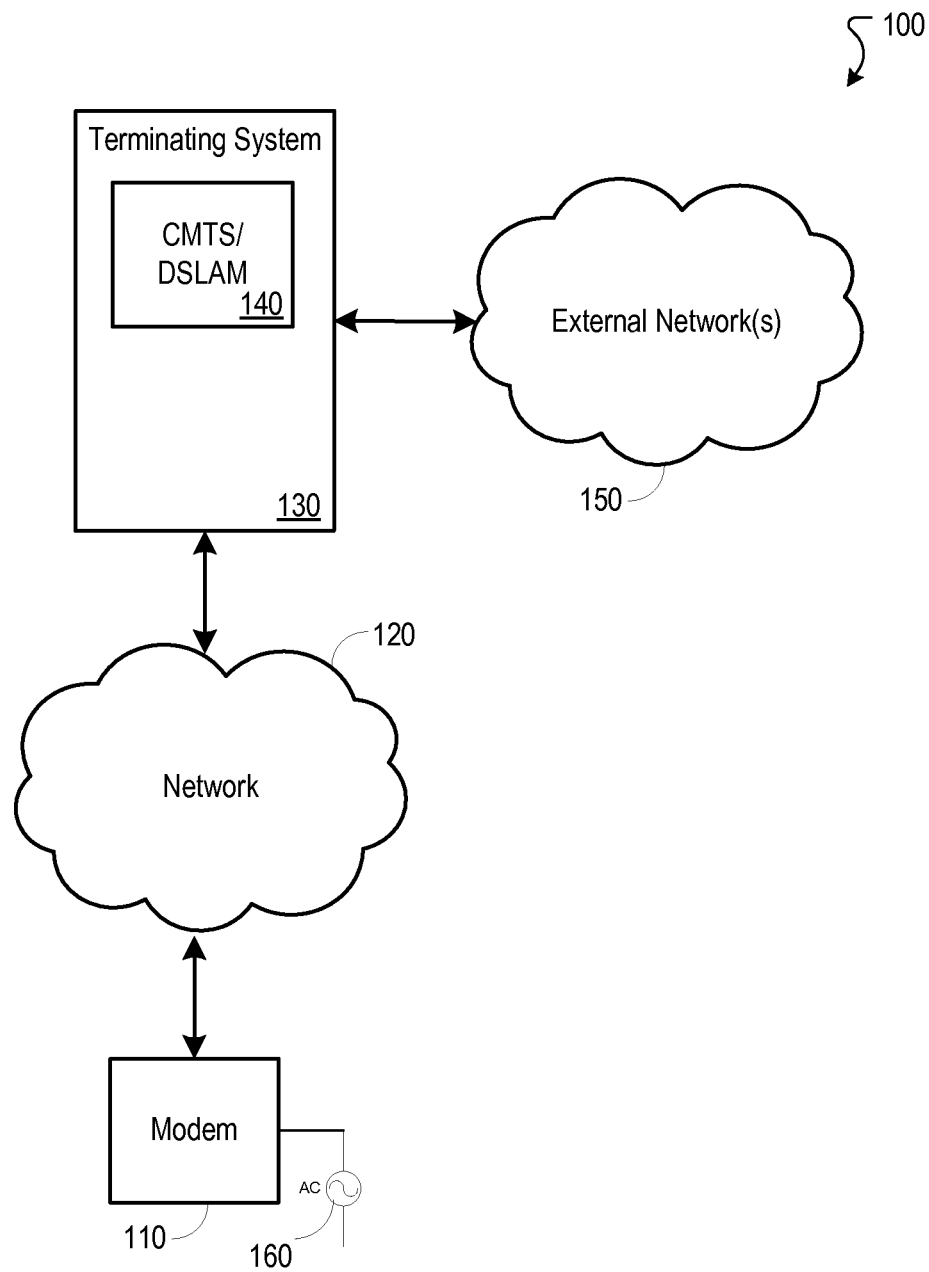
FIG. 1 is a block diagram illustrating an example network environment operable to provide power saving for broadband communications devices.

In some implementations of this disclosure, systems and methods can operate to detect an external power failure and to instruct device logic to enter a power savings mode. In some implementations, power savings logic can operate to receive and/or monitor a signal to identify an external power failure. In other implementations, power saving logic can poll power monitoring logic to identify an external power failure. When an external power failure has occurred, power saving logic can instruct auxiliary processor(s) and/or low priority service (s) logic to enter a power savings mode thus reducing modem power drain and reducing the likelihood of a high priority service outage. Subsequently, power saving logic can determine when external power is restored and instruct auxiliary processor(s) and low priority service(s) logic to return to normal operation.

Systems and methods of this disclosure can operate to provide a mechanism for power saving for broadband devices using power fail signals. In some implementations, power saving logic can be alerted via a signal from power monitoring logic that external power is unavailable. The power saving logic can then inform a primary processor to enter power saving mode, which instructs the primary processor to cease offloading work and/or communication with auxiliary processor(s) for low priority services. Moreover, the power saving logic can instruct auxiliary processor(s) to enter power saving mode by turning off some or all functions to conserve battery power.

In some implementations, other low priority service logic can also be instructed to enter power saving mode. Upon entering power saving mode, the power saving logic can wait for a signal that external power has been restored. Upon receiving the signal, the power saving logic can instruct some or all low priority service(s) logic in power saving mode to resume normal operation. Finally, the power saving logic can set and clear the external power failure signal and/or registers, perform diagnostics, record data, and resume normal operation. It should be understood that the power saving logic functions can be encapsulated in one or more other functional logic within the broadband device. In some implementations the external power fail signal can be an interrupt.

Systems and methods of this disclosure can also operate to provide a mechanism for power saving for broadband devices using polling. In other implementations, power saving logic can detect a failure and/or restoration of external power. In some implementations, the power saving logic can detect the external power failure and instruct primary, auxiliary processor(s) and low priority service(s) to enter a power saving mode for low priority services. Subsequently, the power saving logic can regularly poll to identify if external power has been restored. If external power has been restored, the power saving logic can instruct some or all low priority service logic in power saving mode to resume normal operation. It should be understood that the power saving logic functions can be encapsulated in one or more other functional logic within the broadband device.

FIG. 1 is a block diagram illustrating an example network environment operable to provide power saving for broadband communications devices. In some implementations, an end user modem 110 can be provided video, data and/or voice service(s) over a network 120 from a terminating device 130. The modem 110 can be a networked device such as, for example, a cable modem (CM), enhanced multimedia terminal adapters (eMTA), digital subscriber line (DSL) modems, wireless modems, set-top box (STB), among others.

Moreover, the modem 110 can be connected to an external power source and operable to function without external power in a power saving mode. In some implementations, the network 120 can be a hybrid-fiber coax network that uses existing cable infrastructure to provide broadband services. In other implementations, the network 120 can be a digital subscriber line (DSL) network. In still further implementations, the network 120 can be a wireless network and the modem device 110 can be a wireless modem.

In some implementations, the termination system 130 can be a cable modem termination system (CMTS) 140 or digital subscriber line access multiplexer (DSLAM) 140. In other implementations, the termination system 130 can be a wireless access point and/or cellular phone tower. Termination systems 130 can connect to external network(s) 150 to provide access to the Internet, telephony systems, alarm monitoring, television broadcasts, among others.

The modem 110 can communicate with other networked devices with a variety of physical and network protocols. The modem can be powered by external power via an AC outlet 160 and an internal battery for backup in the case of an external power 160 failure. In other implementations the modem can be powered by an external power supply with an AC input (not shown). In other implementations, a primary battery can be used in lieu of an external power 160 source.

Figure 2:
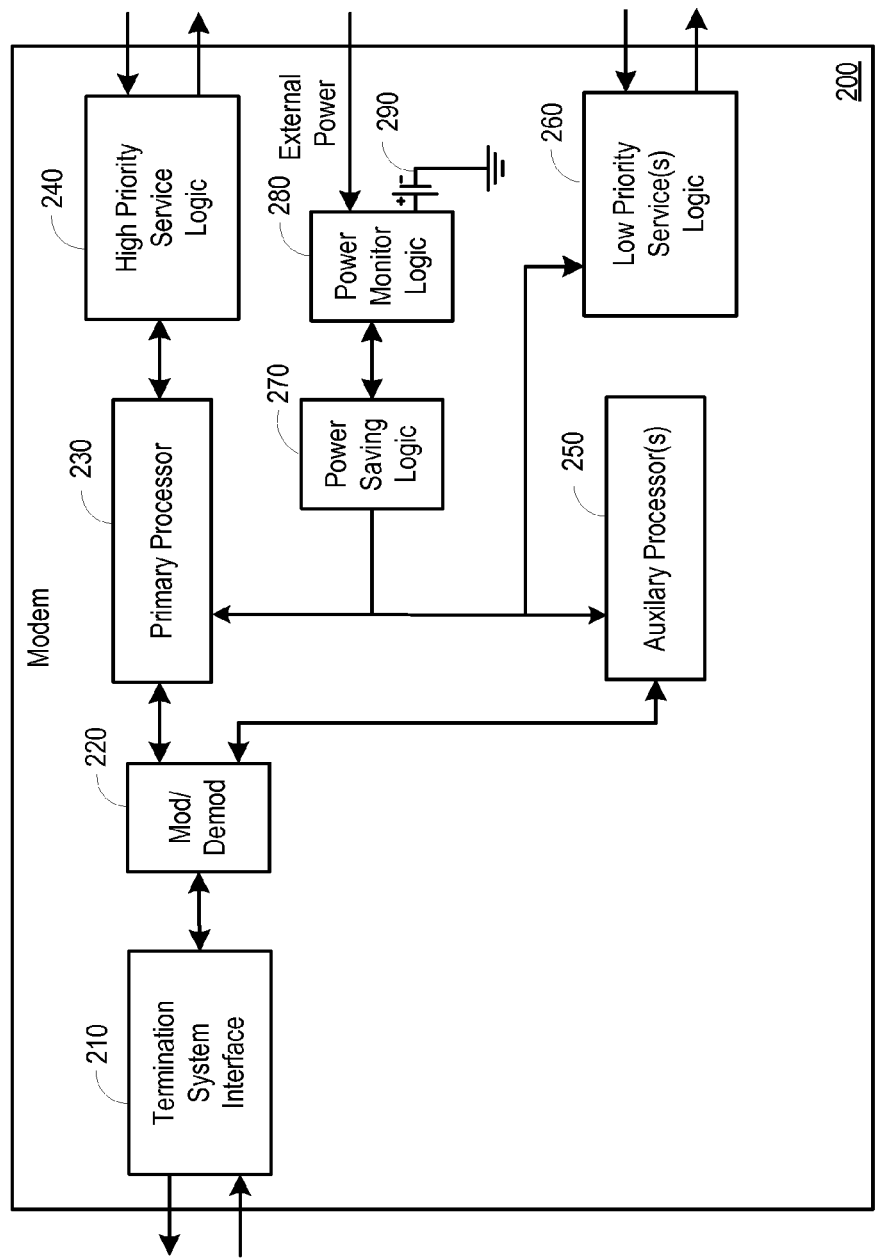
FIG. 2 is a block diagram illustrating an example broadband communications modem device operable to provide power saving.

FIG. 2 is a block diagram illustrating an example broadband communications modem device operable to provide power saving. The modem 200 (e.g., modem 110 of FIG. 1) can include an termination system interface 210, mod/demod logic 220, a primary processor 230, high priority service(s) logic 240, auxiliary processor(s) 250, low priority service(s) logic 260, power saving logic 270, power monitor logic 280, a battery 290 and an interface to connect to external power (e.g., 160 of FIG. 1). The termination system interface 210 can provide for receipt and transmission of communications via a network (e.g., network 120 of FIG. 1). In some implementations, the termination system interface 210 can be an HFC interface. In other implementations, the termination system interface 210 can be a traditional telephone line operable to provide asymmetrical DSL (ADSL). In still further implementations, the termination system interface 210 can be a wireless interface using 802.11x or WiMAX, among others.

Mod/demod logic 220 can also be included in the modem 200 and can operate to modulate and/or demodulate incoming or outgoing signals. In some implementations, the mod/demod 220 can connect to the termination system interface 210 and provide for manipulation of data signals. A primary processor 230 can operate to carry out general and/or specific processing for the modem 200. In addition, a primary processor 230 can perform processing tasks for high priority service (s) and can also instruct and/or offload processing tasks to auxiliary processor(s) 250. One or more auxiliary processor (s) 250 can operate to carry out general and/or specific processing for the modem including processing tasks for low priority service(s).

Power saving logic 270 can operate to provide power saving for broadband communications devices. In some implementations, the power saving logic 270 functions can be distributed among modem logic. In other implementations, the power saving logic 270 can be an isolated block. In yet other implementations the power saving logic 270 can be included in primary processor 230. Power supply monitoring logic 280 can determine when external power is lost and restored and can generate an external power failure signal. In some implementations power monitoring logic 270 can be read to determine the status of the external power. A battery 290 can operate to provide power to the modem 200 if an external power (e.g., AC power 160 of FIG. 1) failure occurs. In some implementations, the battery 290 can be one or many battery units. In other implementations, external power can be supplied by an uninterruptible power supply (UPS) external to the modem.

When the loss of external power (e.g., AC power 160 of FIG. 1) can be detected by logic in the modem 200 such as, for example, by the power monitoring logic 280, a signal can be generated to alert the power saving logic 270 to enter power saving mode and operate using the backup battery 290. In power saving mode, the power saving logic 270 can instruct the primary processor to cease tasking and sending instructions to auxiliary processor(s) 250. Subsequently, the power saving logic 270 can instruct the auxiliary processor(s) 250 and low priority service(s) logic 260 to cease some or all operations for low priority services to conserve battery 290 power. In some implementations, the power saving logic 270 can await a signal from the power monitor logic 280 to indicate that external power (e.g., AC power 160 of FIG. 1) has been restored. In other implementations, the power saving logic 270 can poll power monitor logic 280 directly to identify if external power has been restored. Once external power is restored, the power saving logic 270 can instruct some or all auxiliary processor(s) and low priority service(s) logic in power saving mode to resume normal operations and the modem 200 will resume use of external power.

Figure 3:
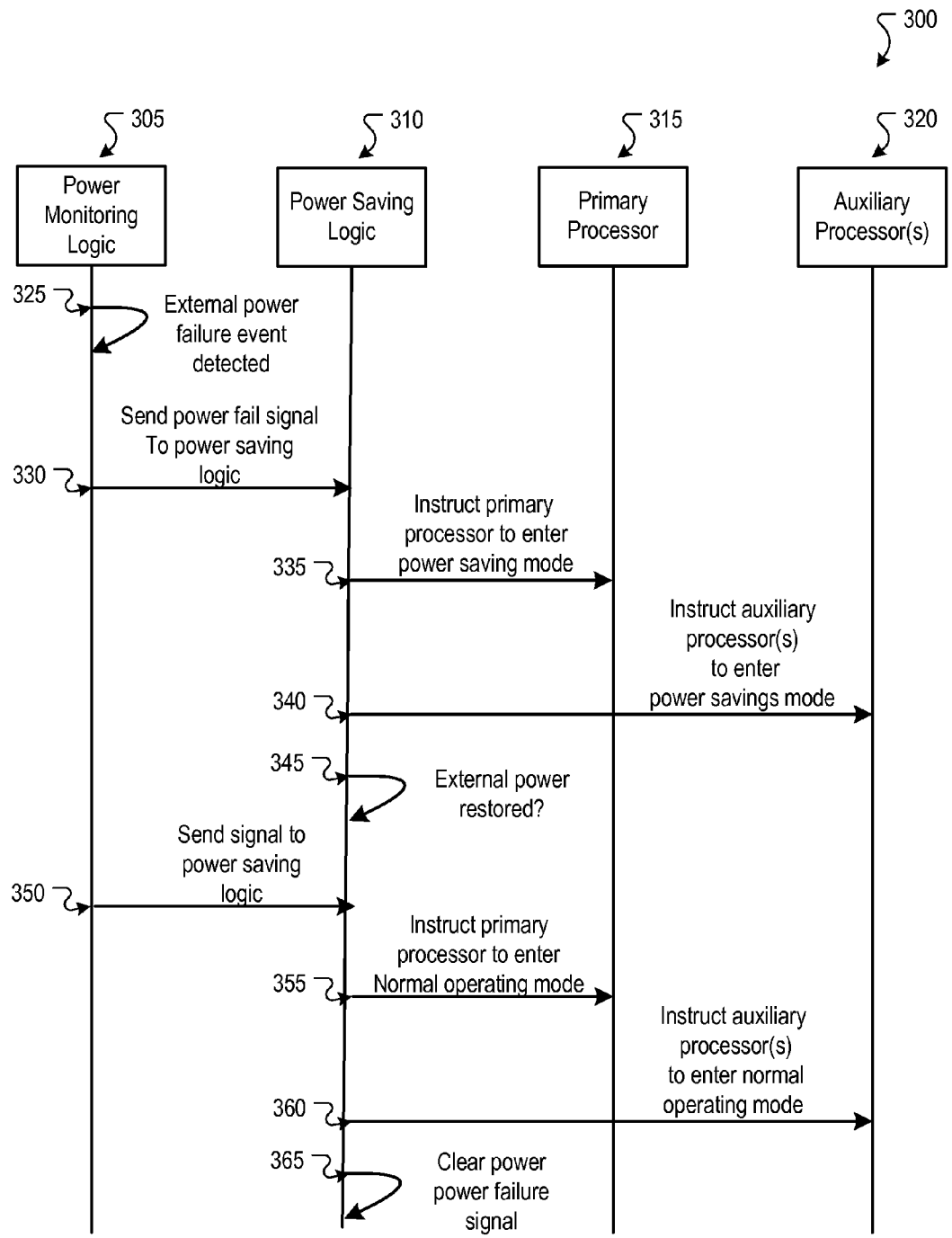
FIG. 3 is a sequence diagram illustrating an example method operable to provide power saving for broadband communications devices.

FIG. 3 is a sequence diagram illustrating an example method operable to provide power saving for broadband communications devices. The sequence diagram can involve internal modem (e.g., modem 110 of FIG. 1 and 200 of FIG. 2) interactions between power monitoring logic 305 (e.g., power monitoring logic 280 of FIG. 2), power saving logic 310 (e.g., power saving logic 270 of FIG. 2), primary processor 315 (e.g., primary processor 230 of FIG. 2), and auxiliary processor(s) 320 (e.g., auxiliary processor(s) 250 of FIG. 2). The initialization flow for power saving for broadband devices can begin when power monitoring logic 305 detects external power unavailability 325 and generates a power failure signal 330. In some implementation the power failure signal can be an interrupt. In other implementations examples, the power saving logic 310 can detect the external power unavailability from reading a register in the power monitoring logic 305. In another example, the power saving logic 310 can detect the power unavailability by a signal received from other modem logic In some implementations power saving logic 310 can be distributed physically across other functional logic within the modem such as, for example, the primary processor 315. The power savings logic 310 can instruct the primary processor 315 of external power failure. The instruction can be observed as a external signal, processor interrupt, or other computational mechanism. In some implementations, a register can be written to alert the primary processor 315 of external power failure. In other implementations, the primary processor 315 does not require notification and enters power saving mode upon receipt of the external power unavailability. In power saving mode, the primary processor 315 can cease sending instructions and/or tasks to auxiliary processor(s) 320.

In some implementations, the power savings logic 310 can then send instruction(s) to the auxiliary processor(s) 320 to enter power saving mode (340). The instruction can be observed as a external signal, processor interrupt, or other computational mechanism. In some implementations, a register can be written to alert the auxiliary processor(s) 315 of external power failure. In other implementations, the auxiliary processor(s) 315 do not require notification and enters power saving mode upon receipt of the external power unavailability. In power saving mode, the auxiliary processor(s) 320 can cease some or all operation to reduce the drain on backup battery.

In other implementations, the power savings logic 310 can then send instruction(s) to the low priority service(s) logic (not shown) to enter power saving mode (340). The instruction can be observed as a external signal, processor interrupt or other computational mechanism. In some implementations, a register can be written to alert low priority service(s) logic (e.g., low priority services logic 260 of FIG. 2) of external power failure. In other implementations, low priority service(s) logic do not require notification and enters power saving mode upon receipt of the external power unavailability. In power saving mode, low priority service(s) logic can cease some or all operation to reduce the drain on backup battery.

In some implementations, the power saving logic 310 can poll periodically to identify whether external power has been restored (345). In other implementations, the power saving logic 310 can remain in power saving mode until prompted by power monitoring logic 305. Once the power saving logic 310 has been alerted that external power has been restored, the power saving logic 310 can proceed to send instructions and/or signals to primary processor 315 to exit power saving mode and resume normal operations (355). In other implementations, the primary processor 315 does not require notification and exits power saving mode upon detecting external power. In normal operating mode, the primary processor 315 can send instructions and/or tasks to auxiliary processor(s) 320.

Subsequently, the power saving logic 310 can then send instruction(s) and/or signal(s) to the auxiliary processor(s) 320 to exit power saving mode and resume normal operating mode (360). In other implementations, the auxiliary processor(s) 320 does not require notification and exits power saving mode upon monitoring external power availability and/or receiving instruction from the primary processor 315. In normal operating mode, the auxiliary processor(s) 320 can resume some or all normal operations.

Additionally, the power saving logic 310 can, send an instruction(s) and/or signal(s) to the low priority service(s) logic (not shown) to exit power saving mode and resume normal operating mode. In other implementations, the low priority service(s) logic (e.g., low priority services logic 260 of FIG. 2) does not require notification and exits power saving mode upon monitoring external power availability and/or receiving instruction from the primary processor 315. In normal operating mode, the low priority service(s) logic can resume some or all normal operations.

Following the exit of power saving mode, in some implementations, the power saving logic 310 can clear the power failure signal 365. It should be understood that the power saving logic 310 functions can be distributed physically across other functional logic within the modem.

Figure 4:
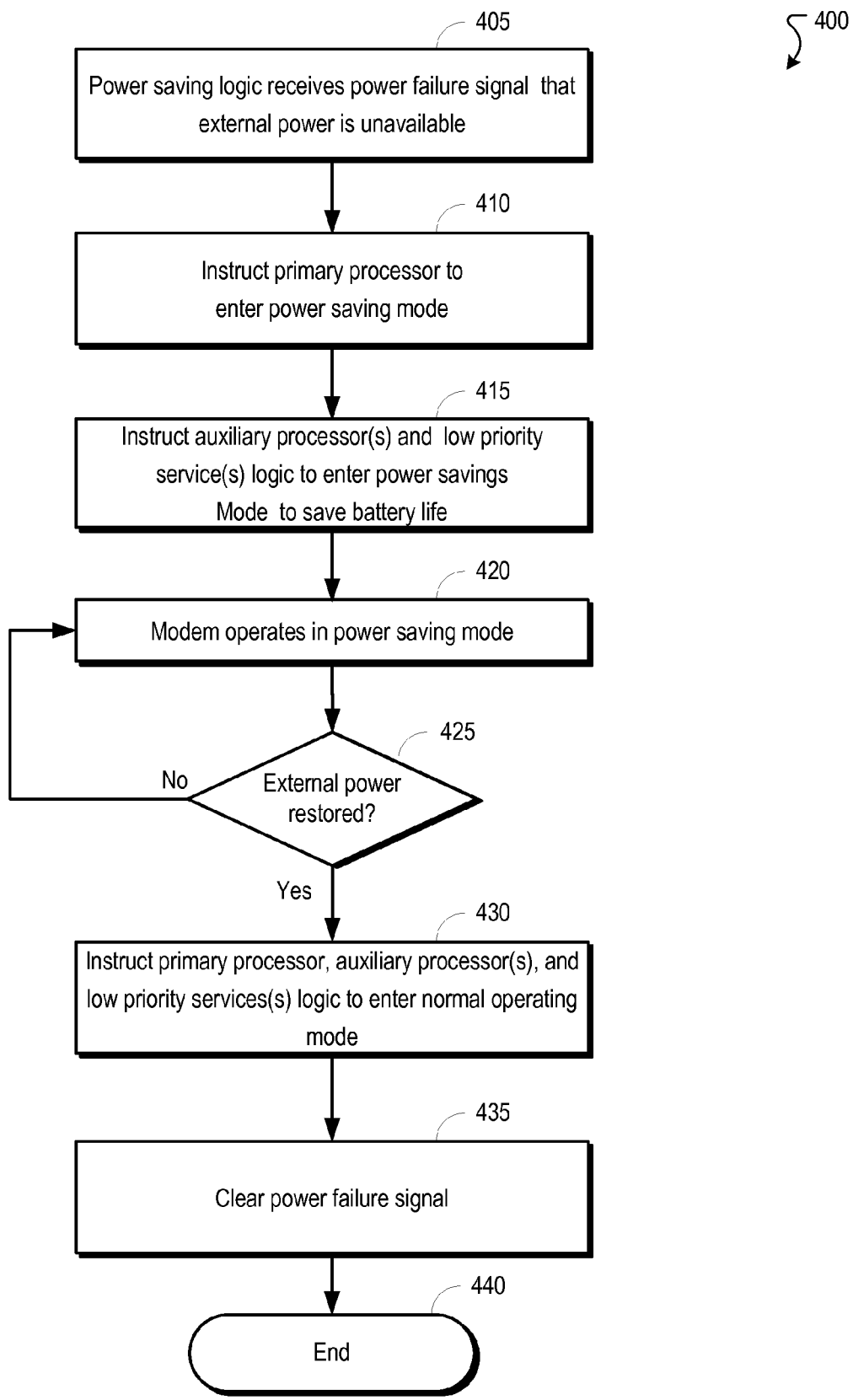
FIG. 4 is a flowchart illustrating an example process operable to provide power saving for broadband communications devices using a power failure signal.

FIG. 4 is a flowchart illustrating an example process operable to provide power saving for broadband communications devices using a power failure signal. The process 400 begins at stage 405 when power saving logic receives a power failure signal. The power failure signal can be generated by power monitoring logic (e.g., power monitoring logic 280 of FIG. 2) and received by power saving logic (e.g., power saving logic 270 of FIG. 2). In some implementations, the power monitoring logic can detect the external power failure and generate an interrupt. In other implementations, a register or another form of communication can alert the power saving logic that external power is unavailable.

At stage 410, the power saving logic can instruct a primary processor to enter power saving mode. The power savings logic (e.g., power saving logic 270 of FIG. 2) can instruct a primary processor (e.g., primary processor 230 of FIG. 2) by transmitting an internal device signal, interrupt and/or setting a register to enter power saving mode. In some implementations, when the primary processor enters power saving mode, the primary processor can cease sending instructions and/or tasks to auxiliary processor(s). In other implementations, the primary processor can perform other actions when placed in power saving mode, including powering off some processor functions.

At stage 415, the power saving logic can instruct auxiliary processor(s) and/or low priority service(s) logic (e.g., low priority service(s) logic 260 of FIG. 2) to enter power savings mode to extend battery life. The power savings logic (e.g., power saving logic 270 of FIG. 2) can instruct an auxiliary processor(s) (e.g., auxiliary processor(s) 240 of FIG. 2) and/or low priority service(s) logic (e.g., low priority service(s) logic 260 of FIG. 2) by transmitting an internal device signal, interrupt and/or setting a register to enter power saving mode. In some implementations, when the auxiliary processor(s) enters power saving mode, the processor(s) can shutdown some or all functions to conserve battery power.

At stage 420, the modem operates in power saving mode. The modem (e.g., modem 110 of FIG. 1 and 200 of FIG. 2) can operate in power saving mode by the power saving logic instructing the primary processor (e.g., primary processor 230 of FIG. 2), auxiliary processor(s) (e.g., auxiliary processor(s) 250 of FIG. 2), and low priority service(s) logic (e.g., low priority service(s) logic 260 of FIG. 2) to enter and remain in power saving mode.

At stage 425, a determination is made whether external power has been restored. The determination can be made, for example, by the power saving logic (e.g., power saving logic 270 of FIG. 2) or the primary processor of the modem (e.g., primary processor 230 of FIG. 2). In other implementations, the determination is made by other modem logic or automatically.

If the external power had not been restored, the process 400 returns to stage 420 and the modem continues operations in power saving mode. The modem (e.g., modem 110 of FIG. 1 and 200 of FIG. 2) can operate in power saving mode by the power saving logic instructing the primary processor and auxiliary processor(s) (e.g., auxiliary processor(s) 250 of FIG. 2) and low priority service(s) logic (e.g., low priority service(s) logic 260 of FIG. 2) to enter and remain in power saving mode.

If the external power had been restored, then the power saving logic instructs modem logic to resume normal operations at stage 430. The power logic (e.g., power saving logic 250 of FIG. 2) can instruct resuming normal operations to the primary processor (e.g., primary processor(s) 230 of FIG. 2), auxiliary processor(s) (e.g., auxiliary processor(s) 250 of FIG. 2), and low priority service(s) logic (e.g., low priority service(s) logic 260 of FIG. 2) by transmitting an internal device signal and/or setting a register to exit power saving mode and resume normal operations.

At stage 435, the power saving logic clears the power failure signal. In other implementations, the primary processor can clear the power failure signal. It should be understood that the power saving logic functions can be distributed physically across other functional modules within the modem. The process 400 can end at stage 440.

Figure 5:
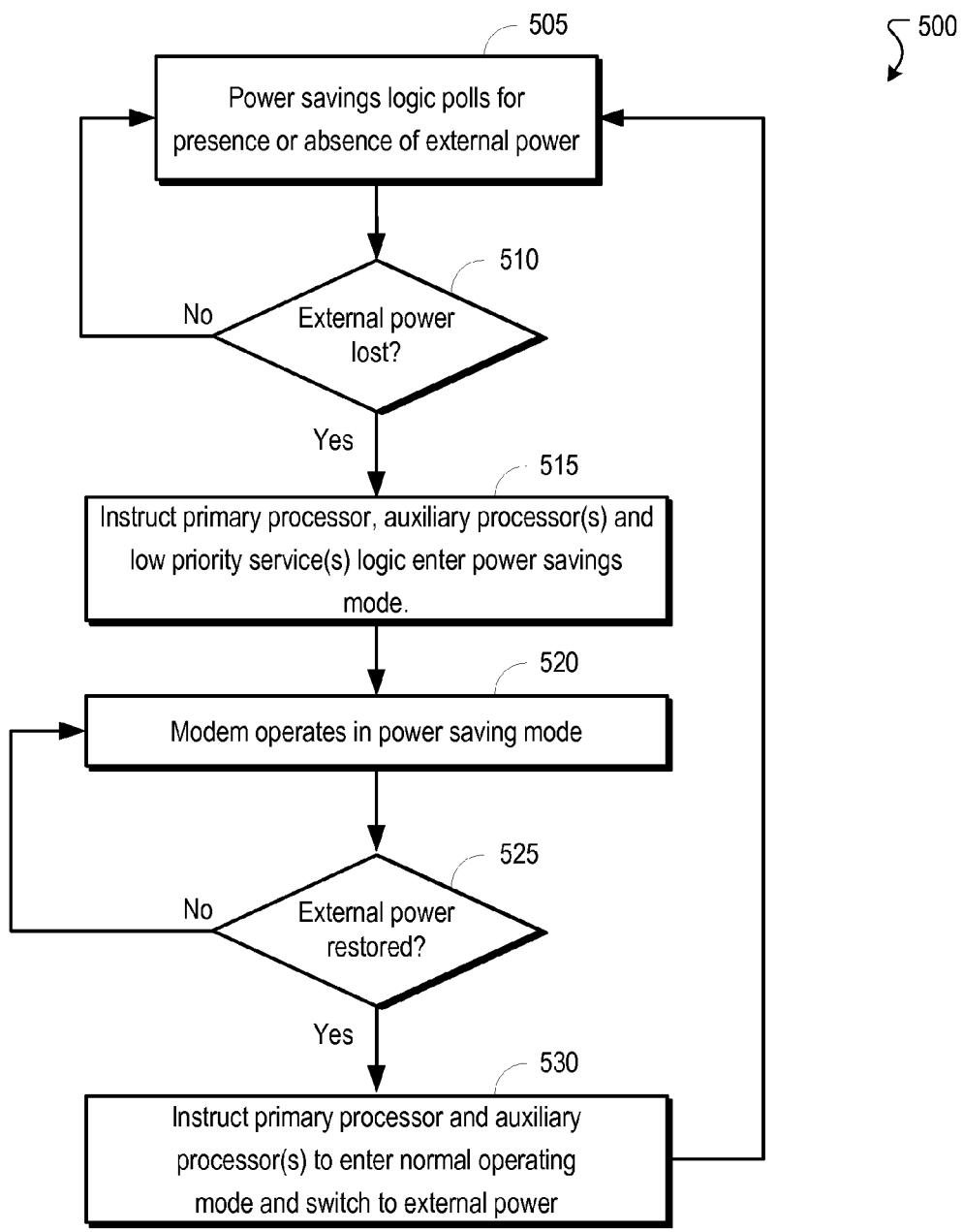
FIG. 5 is a flowchart illustrating another example process operable to provide power saving for broadband communications devices using polling.

FIG. 5 is a flowchart illustrating another example process operable to provide power saving for broadband communications devices using polling. The process 500 begins at stage 505 when the power savings logic polls for the unavailability of external power. The power savings logic (e.g., power savings logic 270 of FIG. 2) polling can occur by sending and/or receiving requests to power monitoring logic (e.g., power monitoring logic 280 of FIG. 2) to identify the status of external power (e.g., external power 160 of FIG. 1). In alternative implementations, other modem logic such as, for example, the primary processor can poll for the loss of external power.

At stage 510, a determination is made whether external power has been lost. The determination can be made, for example, by the power saving logic (e.g., power saving logic 270 of FIG. 2) or the primary processor (e.g., primary processor 230 of FIG. 2) of the modem. In other implementations, the determination is made by other modem logic.

If the external power had not been lost, the process 500 returns to stage 505 and the modem continues operations in normal mode and polling for loss of presence of external power. The modem (e.g., modem 110 of FIG. 1 and 200 of FIG. 2) can operate in normal mode when not operating in power saving mode.

At stage 515, a determination is made that external power has been lost. The power savings logic (e.g., power saving logic 270 of FIG. 2) can detect power lost and instruct primary processor (e.g., primary processor 230 of FIG. 2), auxiliary processor(s) (e.g., auxiliary processor(s) 250 of FIG. 2) and low priority service(s) logic (e.g., low priority services logic 260 of FIG. 2) to enter a power savings mode by transmitting an internal device signal and/or setting a register to enter power saving mode. In some implementations the electrical signal can be an interrupt. In other implementations, the electrical signal can generated automatically using another mechanism. In other implementations the primary processor can inform the auxiliary processor(s) and/or low priority service(s) logic to enter power savings mode. The primary processor (e.g., primary processor 250 of FIG. 2) can alert the auxiliary processor(s) and/or low priority service(s) logic by sending an electrical signal or writing a register. In some implementations, the electrical signal can generated automatically using another mechanism. In other implementations the electrical signal can be an interrupt.

At stage 520, the modem operates in power saving mode. When the primary processor enters power saving mode, the primary processor can cease sending instructions and/or tasks to auxiliary processor(s) and auxiliary processor(s) and/or low priority service(s) logic can shutdown some or all functions to conserve batter power. In other implementations, the primary processor can perform additional actions when placed in power saving mode, including powering off some primary processor functions.

At stage 525, a determination is made whether external power has been restored. The determination can be made, for example, by the power saving logic (e.g., power saving logic 270 of FIG. 2) or the primary processor of the modem (e.g., primary processor 230 of FIG. 2). In other implementations, the determination is made by other modem logic. In still further implementations, the determination is made by other modem logic or automatically.

If the external power had not been restored, the process 500 returns to stage 520 and the modem continues operations in power saving mode.

If the external power had been restored, then the power saving logic can instruct modem logic to resume normal operations at stage 530. The power saving logic (e.g., power saving logic 270 of FIG. 2) instructs the primary processor (e.g., primary processor(s) 230 of FIG. 2), auxiliary processor (s) (e.g., auxiliary processor(s) 240 of FIG. 2) and low priority service(s) logic (e.g., low priority service(s) logic 260) by transmitting an internal device signal and/or setting a register to exit power saving mode and resume normal operations. In some implementations the internal device signal can be an interrupt In still further implementations, the switch to normal operation can occur by another mechanism without the need for instructions. The process 500 returns to stage 505 where the primary processor regularly polls for external power failure. It should be understood that power saving logic functions can be distributed among other modem logic.

Figure 6:
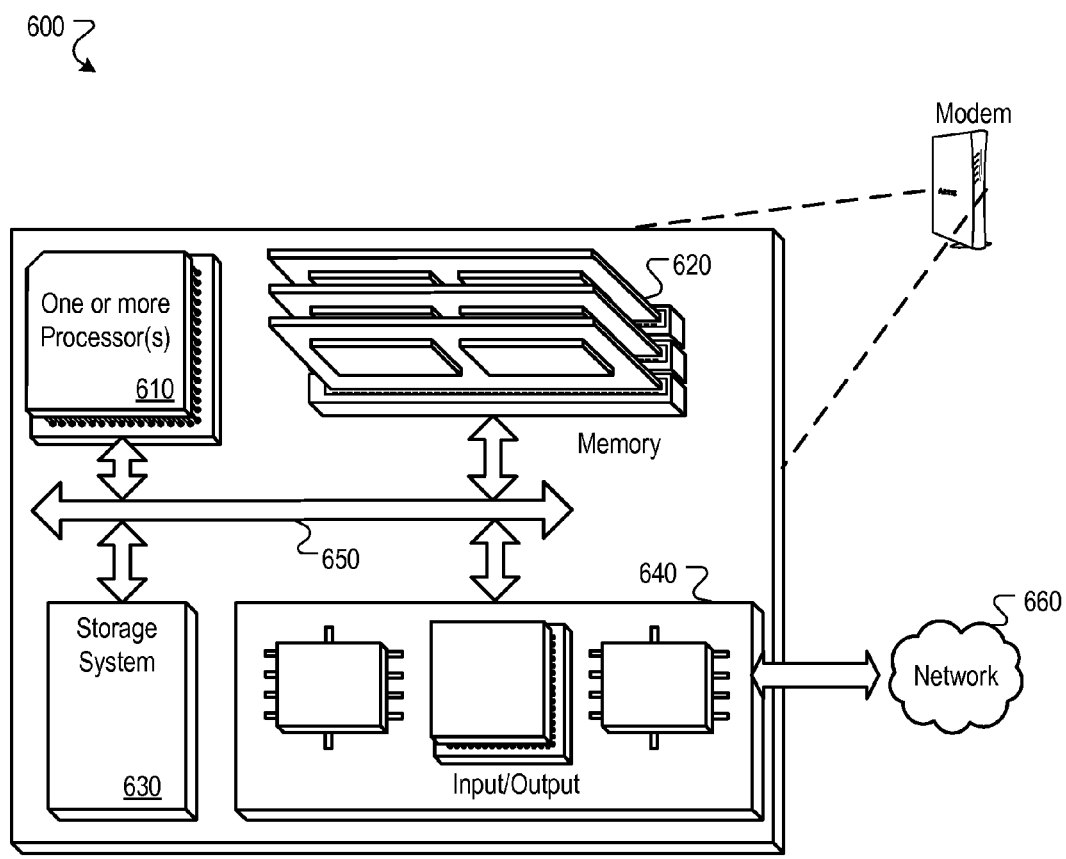
FIG. 6 is a block diagram of a broadband communications modem device operable to provide power saving.

FIG. 6 is a block diagram of a broadband communications modem device operable to provide power saving. The modem 600 can include one or more processor(s) 610, a memory 620, a storage device 630, and an input/output device 640. Each of the modules 610, 620, 630, and 640 can, for example, be interconnected using a system bus 650. The processor(s) 610 is capable of processing instructions for execution within the system 600. In one implementation, the processor(s) 610 is a single-threaded processor(s). In another implementation, the processor(s) 610 is a multi-threaded processor(s). The processor(s) 610 is capable of processing instructions stored in the memory 620 or on the storage device 630.

The memory 620 stores information within the device 600. In one implementation, the memory 620 is a computer-readable medium. In one implementation, the memory 620 is a volatile memory unit. In another implementation, the memory 620 is a non-volatile memory unit.

In some implementations, the storage device 630 is capable of providing mass storage for the device 600. In one implementation, the storage device 630 is a computer-readable medium. In various different implementations, the storage device 630 can, for example, include a hard disk device, an optical disk device, flash memory or some other large capacity storage device.

The input/output device 640 provides input/output operations for the device 600. In one implementation, the input/output device 640 can include one or more of a wireless interface, HFC network interface 660, such as, for example, an IP network interface device, e.g., an Ethernet card, a cellular network interface, a serial communication device, e.g., and RS-232 port, and/or a wireless interface device, e.g., and 802.11 card. In another implementation, the input/output device can include driver devices configured to receive input data and send output data to other input/output devices, as well as sending communications to, and receiving communications from various networks.

The device (e.g., a modem) of this disclosure, and modules thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor(s)" encompasses all apparatus, devices, and machines for processing data, including by way of example a programmable processor(s), a computer, or multiple processors or computers. The system processor(s) can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors (general microprocessors being transformed into special purpose microprocessor through the application of algorithms described herein), and any one or more processors of any kind of digital computer. Generally, processor(s) will receive instructions and data from a read only memory or a random access memory or both. The components of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor(s) and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A system comprising:
a modem operable to communicate with a network termination system and one or more local devices, wherein the one or more local devices are associated with voice communication services or data communication services;
the modem including a primary processor and logic operable to provide the voice communication services;
the modem including one or more auxiliary processors and logic operable to provide the data communication services;
the modem further including power loss detection logic operable to detect loss of a first power source;
the power loss detection logic operable to instruct power saving logic operable to provide power to the primary processor and logic associated with the voice communication services from a second power source upon loss of the first power source, the power saving logic further operable to instruct the primary processor to cease offloading work to the one or more auxiliary processors and communications with the one or more auxiliary processors for low priority services;
the power savings logic operable to place the one or more auxiliary processors and logic associated with the data communication services in a power savings mode; and
the power loss detection logic further including logic operable to detect restoration of the first power source and instruct the power savings logic to resume providing power from the first power source to both the primary processor and logic associated with the voice communication services and to the one or more auxiliary processors and logic associated with data communication services.

2. The system of claim 1, wherein a communication link from the modem to the network termination system comprises a cable infrastructure.

3. The system of claim 1, wherein a communication link from the modem to the network termination system comprises a wireless infrastructure.

4. The system of claim 1, wherein a communication link from the modem to the network termination system comprises a fiber optics infrastructure.

5. The system of claim 1, wherein the power savings logic is implemented by the primary processor.

6. The system of claim 1, wherein the second power source comprises one or more batteries internal to the modem.

7. A method, comprising:
generating a power failure signal upon detecting loss of a first power source;
providing power with an auxiliary power source upon detecting loss of the first power source;
instructing a primary processor and logic associated with a first group of voice communication services to enter a first power savings mode powered by the auxiliary power source and instructing the primary processor to cease offloading work to one or more auxiliary processors and communications with the one or more auxiliary processors for low priority services;
instructing the one or more auxiliary processors and logic associated with a second group of data communication services to enter a second power savings mode powered by the auxiliary power source;
identifying that the first power source is restored; and
instructing the primary processor and logic to exit the first power savings mode, and the one or more auxiliary processors and logic to exit the second power savings mode.

8. The method of claim 7, wherein the power failure signal comprises an interrupt signal.

9. The method of claim 7, wherein first power savings mode comprises limiting a first set of processing functions of the primary processor and/or logic associated with providing the first group of voice communication services.

10. The method of claim 7, wherein the second power savings mode comprises limiting a second set of processing functions of the one or more auxiliary processors and/or logic associated with providing the second group of data communication services.

11. The method of claim 7, wherein the first group of voice communication service and second group of data communication services are provided by a cable infrastructure.

12. The method of claim 7, wherein the auxiliary power source comprises one or more batteries.

13. The method of claim 12, further comprising instructing the primary processor and logic and the one or more auxiliary processors and logic to discontinue using the auxiliary power source.

14. The method of claim 7, wherein the first group of voice communication services and second group of data communication services are provided by a wireless infrastructure.

15. A method, comprising:
polling to detect operability of a primary power source;
providing power with an auxiliary power source upon detecting loss of the primary power source;
instructing a primary processor and logic associated with a first group of voice communication services to enter a first power savings mode, wherein power is provided by the auxiliary power source and further instructing the primary processor to cease offloading work to one or more auxiliary processors and communications with the one or more auxiliary processors for low priority services;
instructing the one or more auxiliary processors and logic associated with a second group of data communication services to enter a second power saving mode, wherein power is provided by the auxiliary power source;
polling to determine restoration of the primary power source; and
instructing the primary processor, the one or more auxiliary processors and logic to resume normal operation.

16. The method of claim 15, wherein first power savings mode comprises limiting processing functions of the primary processor and/or logic associated with providing the first group of voice communication services.

17. The method of claim 15, wherein the second power savings mode comprises limiting processing functions of the one or more auxiliary processors and/or logic associated with providing the second group of data communication services.

* * * * *